(12) United States Patent
Chong et al.

(10) Patent No.: US 9,829,701 B2
(45) Date of Patent: *Nov. 28, 2017

(54) FLEXIBLE DISPLAY DEVICE

(71) Applicant: SAMSUNG DISPLAY CO., LTD., Yongin-si, Gyeonggi-Do (KR)

(72) Inventors: Jong Ho Chong, Hwaseong-si (KR); Dong-wook Choi, Hwaseong-si (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 115 days.

This patent is subject to a terminal disclaimer.

(21) Appl. No.: 14/844,013

(22) Filed: Sep. 3, 2015

(65) Prior Publication Data

US 2016/0202476 A1   Jul. 14, 2016

(30) Foreign Application Priority Data

Jan. 14, 2015   (KR) .................. 10-2015-0007000

(51) Int. Cl.
| | |
|---|---|
| *G02B 3/08* | (2006.01) |
| *G02B 27/00* | (2006.01) |
| *G06F 3/041* | (2006.01) |
| *G02B 3/14* | (2006.01) |
| *G02F 1/1333* | (2006.01) |
| *G06F 3/044* | (2006.01) |
| *G02B 3/00* | (2006.01) |
| *G02B 27/09* | (2006.01) |

(52) U.S. Cl.
CPC ....... *G02B 27/0068* (2013.01); *G02B 3/0043* (2013.01); *G02B 3/14* (2013.01); *G02B 27/0961* (2013.01); *G02F 1/133305* (2013.01); *G06F 3/044* (2013.01); *G06F 3/0412* (2013.01)

(58) Field of Classification Search
CPC ........... G02B 27/0068; G02B 27/0961; G02B 3/0043; G02B 3/14; G06F 3/044; G06F 3/0412; G02F 1/133305
See application file for complete search history.

(56) References Cited

U.S. PATENT DOCUMENTS

| | | | |
|---|---|---|---|
| 2008/0024872 A1 | 1/2008 | Dunn et al. | |
| 2014/0232956 A1* | 8/2014 | Kwon | ............... G02F 1/133305 349/12 |

FOREIGN PATENT DOCUMENTS

| | | |
|---|---|---|
| KR | 10-2006-0066461 A | 6/2006 |
| KR | 10-2009-0033454 A | 4/2009 |
| KR | 10-2010-0084587 A | 7/2010 |
| KR | 10-2011-0004953 A | 1/2011 |

OTHER PUBLICATIONS

Xu, et al., "Deformable, Programmable, and Shape-Memorizing Micro-Optics", Advanced Functional Materials (2013), vol. 23, pp. 3299-3306.

* cited by examiner

*Primary Examiner* — Alicia M Harrington
(74) *Attorney, Agent, or Firm* — Lee & Morse, P.C.

(57) ABSTRACT

A flexible display device includes a flexible display panel, a correction panel, and a flexible printed circuit board. The correction panel includes a shape memory polymer layer and a driver. The shape memory polymer layer includes microlenses and the driver control the microlenses. The flexible printed circuit board connects the driver to a driving circuit board.

12 Claims, 11 Drawing Sheets

FLEXIBLE DISPLAY DEVICE

CROSS-REFERENCE TO RELATED APPLICATION

Korean Patent Application No. 10-2015-0007000, filed on Jan. 14, 2015, and entitled, "Flexible Display Device," is incorporated by reference herein in its entirety.

BACKGROUND

1. Field

One or more embodiments described herein relate to a flexible display device.

2. Description of the Related Art

A flexible display device has a display unit formed on a flexible substrate. The flexible substrate allows a folding operation (e.g., folding and unfolding operations) to be repeatedly performed. The display device may be folded when stored or carried by a user and unfolded when in use. Repeated performance of the folding operation may cause a crease to develop in a folding area of the device over time. The crease may cause a deviation in light distribution which may result in luminance deviation, and also may adversely affect viewing angle when information is displayed on a screen.

SUMMARY

In accordance with one or more embodiments, a flexible display device includes a flexible display panel to display an image; a correction panel including a shape memory polymer layer and a driver on the flexible display panel, the shape memory polymer layer including microlenses and the driver to control the microlenses; and a flexible printed circuit board to connect the driver to a driving circuit board.

The driver may include a switching thin film transistor to control at least one microlens, the at least one microlens connected to an electrode storage plate, the electrode storage plate connected to a drain electrode of the switching thin film transistor and a common electrode, a shape of the at least one microlens may change based on a first voltage, the first voltage based on a difference between a voltage transmitted to the electrode storage plate from the switching thin film transistor and a voltage from the common electrode.

The driver may include a storage capacitor, the switching thin film transistor may transmit a data voltage from a data line to the at least one microlens through the electrode storage plate according to a switching voltage from a gate line, and the storage capacitor may be connected to the electrode storage plate through a first storage plate and is connected to the common electrode through a second storage plate, and the storage capacitor may store the first voltage and to supply the first voltage to the at least one microlens.

The correction panel may include a first substrate including the driver, the electrode storage plate, and the storage capacitor, and a second substrate covering a shape memory polymer layer on the driver, the electrode storage plate, and the storage capacitor. The at least one microlens may correspond to a molded portion of the shape memory polymer layer. The second substrate may include black matrices respectively corresponding to the switching thin film transistor and the storage capacitor.

The correction panel may include the microlenses in a folding area of the display panel. The microlenses may correspond to an entire area of the display panel. The data line and the gate line may extend in different directions relative to the at least one microlens. The flexible printed circuit board may include a first printed circuit board including a first driving integrated circuit connected to the data line to apply the data voltage, and a second printed circuit board including a second driving integrated circuit connected to the gate line to apply the switching voltage.

The device may include a touch screen panel attached to an upper surface of the display panel; and a window substrate covering the touch screen panel, wherein the correction panel is attached to the window substrate. The device may include a touch screen panel attached to an upper surface of the display panel, wherein the correction panel covers the touch screen panel to perform the operation of the window substrate. The device may include a touch screen panel attached to an upper surface of the display panel; and a window substrate to an upper surface of the touch screen panel, wherein the correction panel is between the touch screen panel and the window substrate.

In accordance with one or more other embodiments, a display device includes a first microlens; a second microlens; and a flexible display panel to emit light through the first and second microlenses, wherein the first microlens is to have a first shape in a first area of the flexible display panel and the second microlens is to have a second shape in a second area of the flexible display panel, the first area including a crease and the second area not including the crease, the first shape to reduce a difference in refraction directions between light emitted through the first and second lenses.

The first and second areas may be in a folding area of the flexible display panel. The first shape of the first microlens may be controlled based on a first signal; and the second shape of the second microlens may be controlled based on a second signal, the first and second signals may independently control the first and second shapes of the first and second microlenses, respectively.

The first signal may change the first microlens from an initial shape to the first shape, the light through the microlens in the initial shape emitted in a refraction direction different from the second direction. The first shape of the first microlens may change as the crease changes.

In accordance with one or more embodiments, an apparatus includes an interface and a controller to output a signal through the interface, wherein the signal may have a level that corresponds to a shape of a microlens over a screen of a flexible display panel, the level may change the shape of the microlens to correspond to a refraction direction of light from the screen from a first direction to a second direction. The first direction may be generated by a crease in the flexible display panel; and the second direction may correspond a direction of a second microlens over the screen of the flexible display panel that does not correspond to the crease.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
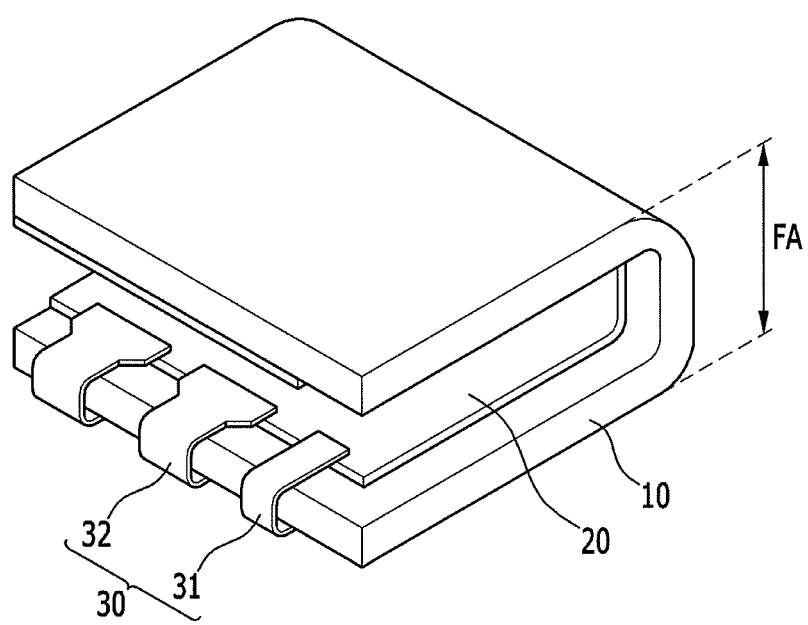
FIG. 1 illustrates an embodiment of a flexible display device in a folded state.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Throughout the specification, it will be understood that when an element such as a layer, film, region, or substrate is referred to as being "on" another element, it can be directly on the other element or intervening elements may also be present. The word "on" means positioning on or below the object portion, but does not essentially mean positioning on the upper side of the object portion based on a gravity direction.

Figure 2:
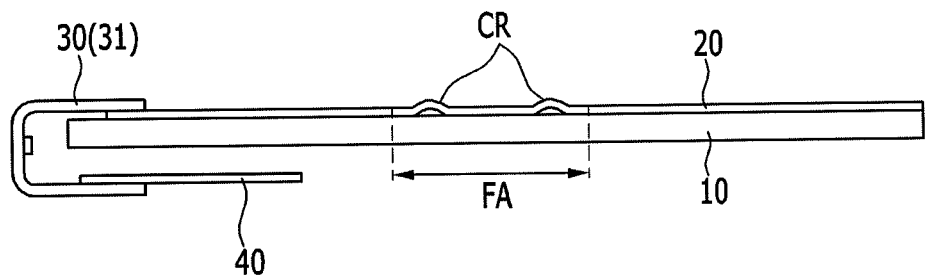
FIG. 2 illustrates an embodiment of the flexible display device in an unfolded state.

FIG. 1 illustrate an embodiment of a flexible display device 100 in a folded state, and FIG. 2 illustrates is a side of the flexible display device 100 of FIG. 1 in an unfolded state. Referring to FIGS. 1 and 2, the flexible display device 100 includes a flexible display panel 10 having a top surface configured to attach a luminance deviation correction panel 20. A printed circuit board 30 is connected to the luminance deviation correction panel 20, the flexible printed circuit board 30 is connected to a driving circuit board 40.

The display panel 10 includes a plurality of pixels arranged in matrix to display an image. The display panel 10 may be, for example, an organic light emitting display panel, a liquid crystal display panel, or an electrophoretic display panel. Since the display panel 10 is formed on a flexible substrate and thus has flexible characteristics, the display panel 10 may be a curved panel or a bendable panel or foldable panel. The flexible substrate of the display panel 10 may be or include a plastic film, and the pixels may be on the flexible substrate to display the image.

In the display panel 10, one or more creases CR may form in a folding area FA that implements a folding operation (e.g., folding and unfolding operations). Since the luminance deviation correction panel 20 is provided in front of the display panel 10, the creases may form on the luminance deviation correction panel 20. In addition, the luminance deviation correction panel 20 is implemented by correcting a luminance distribution of the same state as a plane on which the creases CR do not occur in the folding area FA, while the creases CR are formed in the folding area FA.

Figure 3:
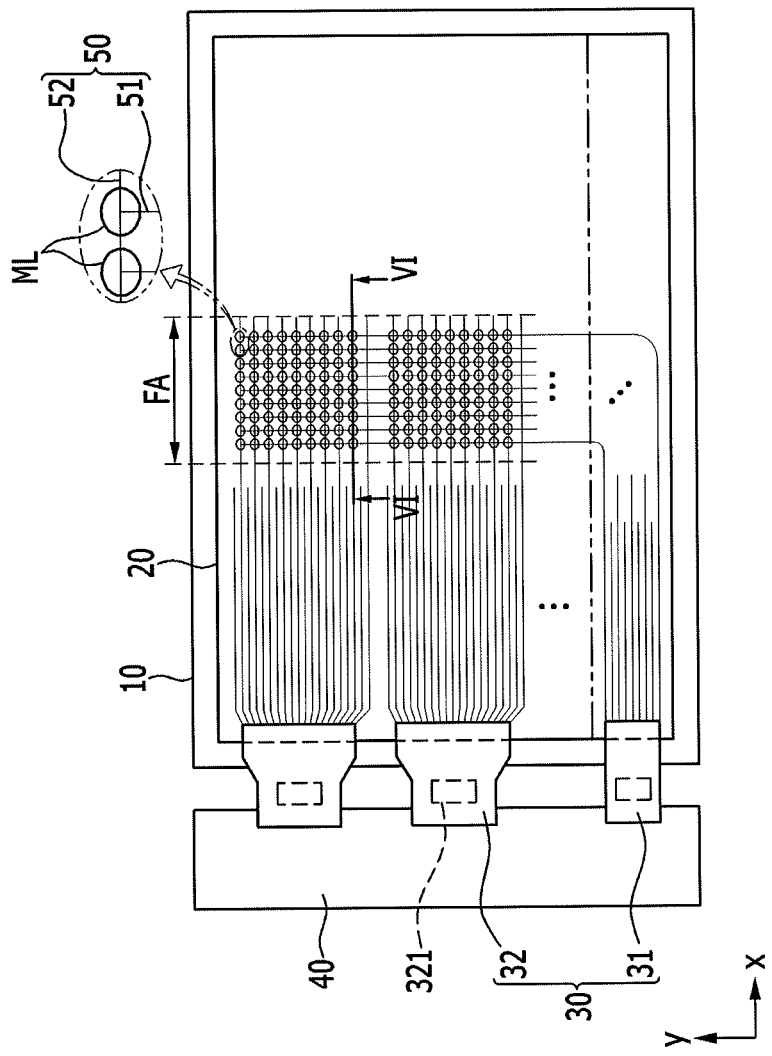
FIG. 3 illustrates another view of the flexible display device.

To this end, the luminance deviation correction panel 20 may be formed by a shape memory polymer and may have an outer surface which includes a plurality of microlenses ML (see FIG. 3). The microlenses ML may be formed by the shape memory polymer, and thus may be integrated with the luminance deviation correction panel 20 to correct the luminance distribution when the flexible display device 100 is viewed externally when the device 100 is in a first plane state in which the creases CR do not appear.

The shapes of the microlenses ML may be variably controlled based on data, which, for example, may be acquired experimentally or based on a simulation. In one embodiment, the data may be generated based on the shapes and sizes of creases CR that occurred in the folding area FA in correspondence to the number of times a folding operation was performed over time during an experiment. In another embodiment, the data may be generated by simulating the formation of creases CR based on the number of times a folding operation is performed. As the shapes of the microlenses ML are variably controlled, a refraction direction of light passing through the microlens ML is changed. As a result, the luminance distribution may be corrected.

FIG. 3 illustrates a plan view of the flexible display device 100. Referring to FIG. 3, the microlenses ML are illustrated to be in a region of the luminance deviation correction panel 20 which corresponds to the folding area FA. The microlenses ML may be arranged in one or more directions. In one embodiment, the microlenses ML are arranged two directions, namely x-axis and y-axis directions. In one embodiment, the microlenses may be arranged throughout the entire area of the luminance deviation correction panel 20 that corresponds to the display panel. In this case, uniformity of the luminance distribution may be controlled in the entire area of the display panel.

The luminance deviation correction panel 20 includes signal lines 50 crossing the microlenses ML in the folding area FA. For example, the signal lines 50 include a data line 51 that extends in one direction (y-axis direction) of the display panel 10 and a gate line 52 that extends the direction (x-axis direction) crossing the data line 51. A plurality of data lines 51 is provided in the microlenses ML and deployed to be spaced apart from each other in the x-axis direction. For example, the data lines 51 are spaced apart from each other in the x-axis direction to correspond to the width of folding area FA and extend in the y-axis direction corresponding to the length of folding area FA.

Further, gate lines 52 are provided for the microlenses ML and arranged to be spaced apart from each other in the y-axis direction crossing the data lines 51. In one embodiment, the gate lines 52 are spaced apart from each other in the y-axis direction to correspond to the length of the folding area FA and extend in the x-axis direction corresponding to the width of the folding area FA. The microlenses ML are at locations whether the data lines 51 and the gate lines 52 cross one another.

Luminance deviation is corrected when the shape(s) of one or more of the microlenses ML are controlled based on signals applied to the data lines 51 and the gate lines 52, e.g., the microlenses ML may be controlled by one or a plurality of lines in the y-axis direction.

Referring to FIGS. 1 to 3, one side of the flexible printed circuit board 30 is connected to the data lines 51 and the gate lines 52 of the luminance deviation correction panel 20. The other one side of the flexible printed circuit board 30 is connected to a driving circuit of the driving circuit board 40.

The flexible printed circuit board 30 includes a first printed circuit board 31 connected to the data lines 51 and a second printed circuit board 32 connected to the gate lines 52. First and second driving integrated circuits 311 and 321 are mounted on the flexible printed circuit board 30, e.g., first and second printed circuit boards 31 and 32, by a chip-on-film method.

The first and second driving integrated circuits 311 and 321 output control signals according to control of the driving circuit board 40. Data voltages and switching voltages are applied to the data lines 51 and the gate lines 52 through the first and second printed circuit boards 31 and 32, respectively. The first and second integrated circuits 311 and 312 may include, for example, one or more controllers for generating the control signals.

In one embodiment, when a data voltage is applied to one data line 51, the data voltage is applied to all y-axis direction microlenses ML corresponding to that data line 51. In addition, when a switching voltage is applied to one gate line 52, the voltage may be applied to all x-axis direction microlenses ML corresponding to that gate line 52. Accordingly, the luminance distribution in the folding area FA is controlled while the shapes of the microlenses ML at portions where the data lines 51 and the gate lines 52 cross each other are controlled.

Figure 4:
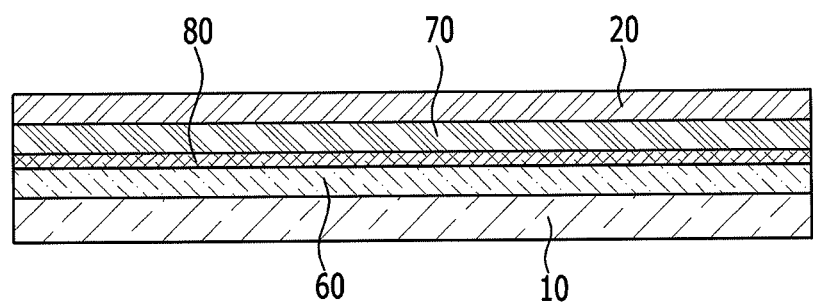
FIG. 4 illustrates a cross-sectional view of the flexible display device.

FIG. 4 illustrates a cross-sectional view of the flexible display device 100 of FIG. 1. Referring to FIG. 4, the flexible display device 100 includes a touch screen panel 60 attached to a top surface of the display panel 10 and a window substrate 70 covering the touch screen panel 60. In this case, the luminance deviation correction panel 20 is attached to the window substrate 70.

Figure 5:
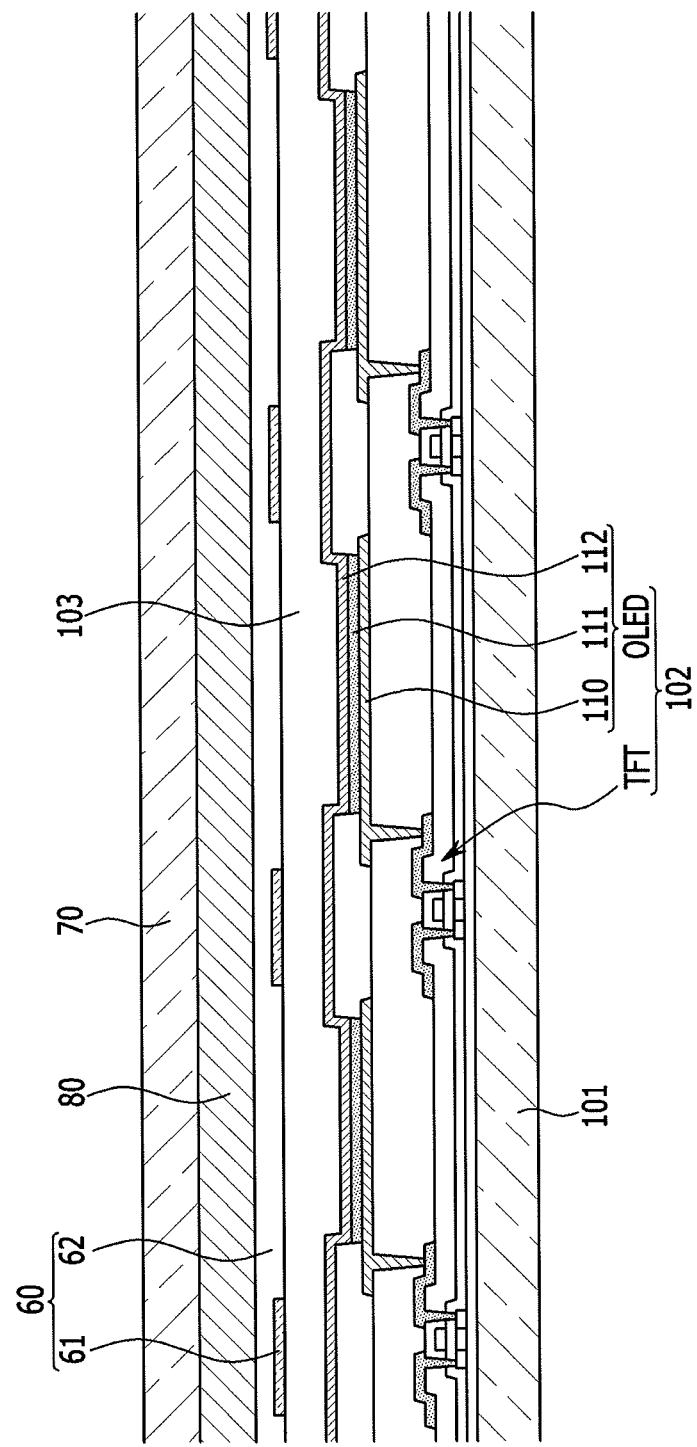
FIG. 5 illustrates an embodiment of an organic light emitting display panel.

FIG. 5 illustrates a cross-sectional view of the organic light emitting display panel 100 to which the flexible display device of FIG. 1 is applied. Referring to FIG. 5, the display panel 10 includes a flexible substrate 101, a plurality of thin film transistors TFT and a plurality of organic light emitting diodes OLED on the flexible substrate 101, a sealed portion 103 covering the plurality of organic light emitting diodes OLED, the touch screen panel 60 on the sealed portion 103, an optical film portion 80, and the window substrate 70. The thin film transistors TFT and the organic light emitting diodes OLED are included in a display unit 102.

The thin film transistors TFT configure a pixel circuit together with a storage capacitor. In one embodiment, the organic light emitting diode OLED may include a pixel electrode 110 connected to the thin film transistor TFT, an organic emission layer 111 on the pixel electrode 110, and a common electrode 112 in an entire display area on the organic emission layer 111.

The pixel electrode 110 may be a hole injection electrode (anode) and the common electrode 112 may be an electron injection electrode (cathode). Holes injected in the anode and electrons injected in the cathode are coupled to each other in the organic emission layer 111. As a result, excitons are generated. Light is emitted based on energy generated when the excitons fall from an excited state to a ground state.

The sealed portion 103 prevents external moisture and oxygen from intruding in the organic light emitting diode OLED by sealing. The sealed portion 103 include, for example, by a thin film encapsulation acquired by stacking at least one inorganic layer and at least one organic layer.

The touch screen panel 60 may include an insulating layer 62 that covers a plurality of sensing electrodes 61. The touch screen panel 60 provides a touch sensing function. The optical film portion 80 suppresses deterioration of screen contrast due to external light by suppressing external light reflection. The positions of the touch screen panel 60 and the optical film portion 80 may be exchanged with each other. The window substrate 70 protects members below the window substrate 70 from external shock and scratches.

Referring back to FIGS. 1 to 3, the display panel 10 is connected to the driving circuit substrate 40 with the flexible printed circuit board 30. The driving circuit board 40 may be formed by the flexible printed circuit board.

Figure 6:
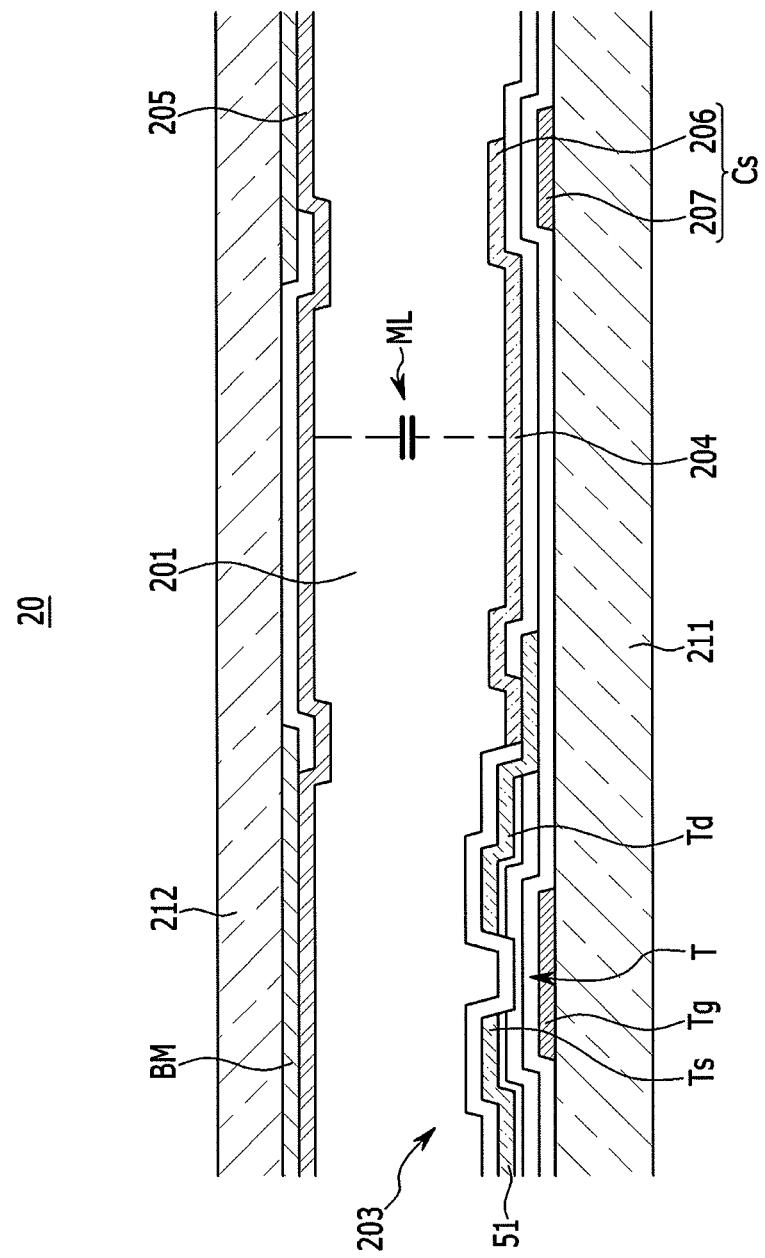
FIG. 6 illustrates an embodiment of a luminance deviation correction panel.
Figure 7:
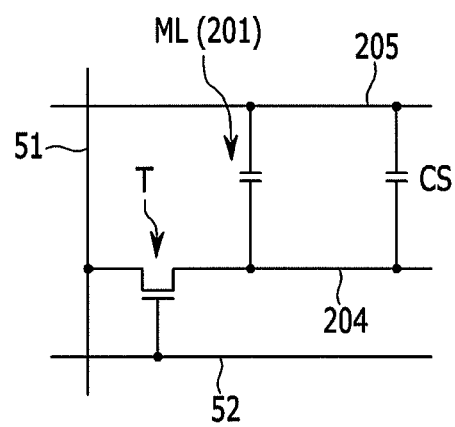
FIG. 7 illustrates an embodiment for controlling a microlens.

FIG. 6 is a cross-sectional view illustrating an embodiment of a luminance deviation correction panel taken along line VI-VI in FIG. 3. FIG. 7 is a schematic view illustrating an embodiment of a circuit structure for controlling the microlenses of the luminance deviation correction panel in FIG. 6.

Referring to FIGS. 6 and 7, the luminance deviation correction panel 20 includes a shape memory polymer layer 201 and a driver 203. The shape memory polymer layer 201 includes microlenses ML formed from the shape memory polymer. The driver 203 controls the microlens ML. The driver 203 includes a switching thin film transistor T for controlling the microlens ML and a storage capacitor Cs. The switching thin film transistor T includes a source electrode Ts, a drain electrode Td, and a gate electrode Tg. For easy description, the microlens ML is illustrated as a capacitor in FIGS. 6 and 7.

The microlens ML of the shape memory polymer layer 201 is connected to an electrode storage plate 204 and a common electrode 205. The electrode storage plate 204 of the microlens ML is connected to the drain electrode Td of the switching thin film transistor T. The common electrode 205 may be connected to the second printed circuit board 32 through the gate line 52 that is stretched in the x-axis direction.

The shape of the microlens ML of the shape memory polymer layer 201 changes based on a voltage corresponding to a difference between voltage transmitted from the drain electrode Td of the switching thin film transistor T to the electrode storage plate 204 and voltage supplied from the common electrode 205. Since the electrode storage plate 204 and the common electrode 205 are at the front of the display panel 10, the electrode storage plate 204 and the common electrode 205 may be made of a transparent material, e.g., indium-tin-oxide ITO.

The switching thin film transistor T is connected to the gate line 52 through the gate electrode Tg, is connected to the data line 51 through the source electrode Ts, and is connected to the electrode storage plate 204 through the drain electrode Td. The switching thin film transistor T transmits the data voltage to the microlens ML through the drain electrode Td and the electrode storage plate 204. The data voltage is input from the data line 51 by driving the first driving integrated circuit 311 according to the switching voltage input from the gate line 52 by driving the second driving integrated circuit 321.

The storage capacitor Cs is connected to the electrode storage plate 204 through a first storage plate 206, and is connected to the common electrode 205 through a second storage plate 207, to store the voltage corresponding to the difference between the voltage from the drain electrode Td of the switching thin film transistor T and the voltage from the common electrode 205. The microlens ML of the shape memory polymer layer 201 changes based on this voltage.

Changing the shape of the microlens ML changes the refraction direction of light passing through the microlens ML. As a result, luminance deviation may be controlled (e.g., to become uniform) in the folding area FA. Accordingly, a viewing angle problem may be solved. The switching voltage input through the gate line 52 by driving the second driving integrated circuit 321 and the data voltage input through the data line 51 by driving the first driving integrated circuit 311 may be set to correspond to various shapes of the microlenses ML, for example, based on the experimental or simulated result data previously described.

The first substrate 211 of the luminance deviation correction panel 20 includes the driver 203, the electrode storage plate 204, and the storage capacitor Cs. The shape memory polymer layer 201 is provided on the driver 203, the electrode storage plate 204, and the storage capacitor Cs. The second substrate 212 is sealed onto the first substrate 211 with a gap by a sealant to protect internal components from the external moisture or other influences. Black matrices BM may be provided at portions of the second substrate 212 corresponding to the switching thin film transistor T and the storage capacitor Cs to improve contrast.

Figure 8A:
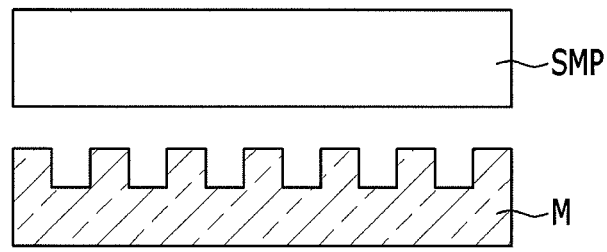
FIGS. 8(a)-8(c) illustrate an embodiment for forming the microlens.
Figure 8B:
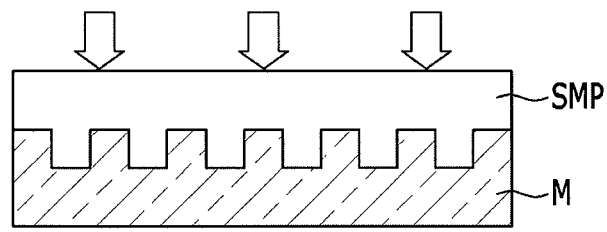
Figure 8C:
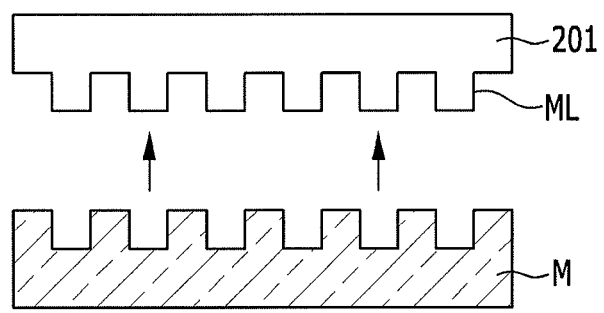

FIGS. 8(a)-8(c) are cross-sectional views illustrating a sequence of operations included in an embodiment for forming a microlens on the luminance deviation correction panel. In FIG. 8(a), a shape memory polymer member SMP and a mold M are first prepared. In FIG. 8(b), the shape memory polymer member SMP is deployed in the mold M and pressed. In FIG. 8(c), the shape memory polymer layer 201 having the microlenses ML is completed by separating and cooling the shape memory polymer member SMP from the mold M. For example, the completed shape memory polymer member SMP may be attached to the driver 203, the electrode storage plate 204, and the storage capacitor Cs of the first substrate 211.

For example, the shape memory polymer member SMP which forms the shape memory polymer layer 201 having the microlens ML may be made, for example, of shape memory polyurethane. Since the shape memory polyurethane introduces a hard aromatic structure or molecules having a plane shape, the shape memory polyurethane may have a high shape memory effect increasing interaction among the molecules.

In the exemplary embodiment, the shape memory polymer layer 201 is formed by the shape memory polymer using an electric property. For example, the shape memory polymer using the electric property may use carbon nanotube (CNT) or carbon nanofiber (CNF) which is a nano filler as a polymer matrix. Recovery performance for the folding operation may be enhanced by this arrangement.

Additionally, or alternatively, the shape of the shape memory polymer may be transformed by heat. In this case, the polymer matrix may be filled with an inorganic filler having thermal conductivity (e.g., alumina, silica, silicon carbide (SiC), aluminum nitride (AlN), or boron nitride) to improve thermal conduction of a polymer composite material.

Figure 9:
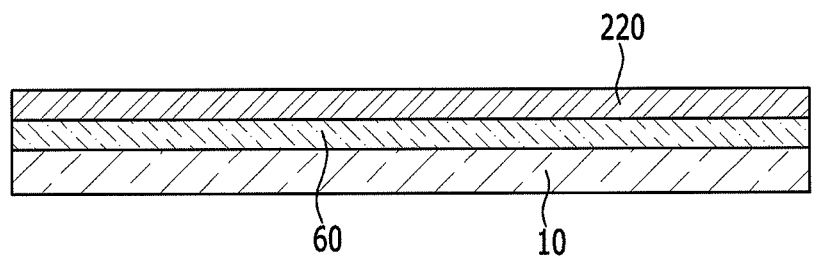
FIG. 9 illustrates another embodiment of a flexible display device.

FIG. 9 is a cross-sectional view of another embodiment of a flexible display device 200 which includes a luminance deviation correction panel 220 that covers the touch screen panel 60. The luminance deviation correction panel 220 may include the components of the window substrate 70 of the first exemplary embodiment to further perform the operation of the window substrate.

Figure 10:
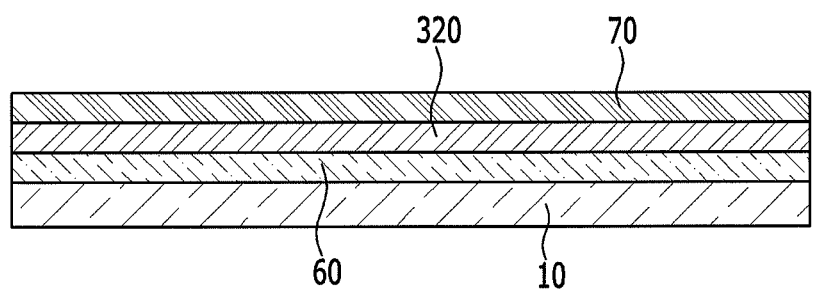
FIG. 10 illustrates another embodiment of a flexible display device.

FIG. 10 is a cross-sectional view of another embodiment of a flexible display device 300 which includes a luminance deviation correction panel 320 between the touch screen panel 60 and the window substrate 70. Thus, the first to third exemplary embodiments exhibit that the luminance deviation correction panels 20, 220, and 230 may be provided at different locations at the front of the display panel 10.

Figure 11:
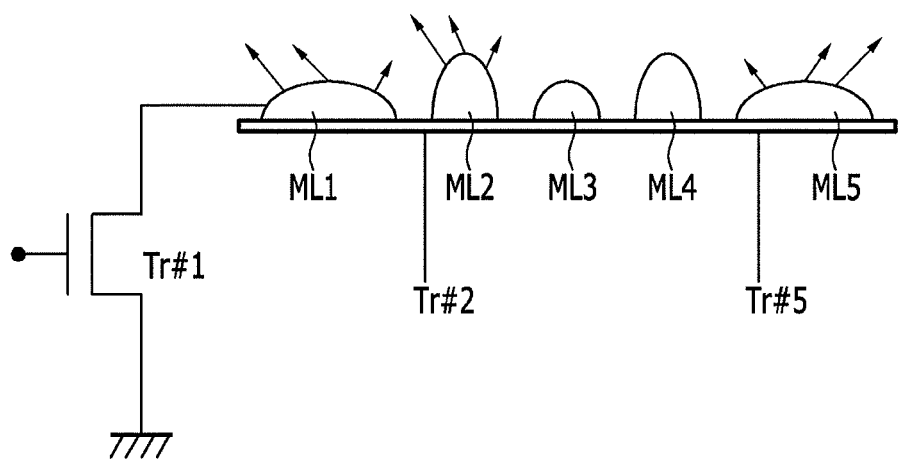
FIG. 11 illustrates an example of how the microlenses may be controlled according to one or more of the aforementioned embodiments.

FIG. 11 illustrates an example of how the microlenses may be controlled according to one or more of the aforementioned embodiments. In FIG. 11, five microlenses ML1 to ML5 are illustrated. The shape of the microlenses may be independently controlled to be the same or different from one another. For example, when one or more creases form, the shapes of the microlenses may be controlled to be different from one another to form, for example, a uniform light distribution in the entire folding area. In the example of FIG. 11, microlenses ML1, ML2, and ML5 are controlled (by different transistors TR#1, TR#2, and TR#5, the transistors for ML3 and ML4 have been omitted for convenience because the shape of these microlenses has not been changed from an initial state) to refract light in different ways (e.g., in different directions) to produce the uniform light distribution. In another embodiment, the shapes of the microlenses may be controlled in areas other than a folding area or for a display which is not flexible.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The integrated circuits, controllers, or boards that generate the control signals described herein may be implemented in logic which, for example, may include hardware, software, or both. When implemented at least partially in hardware, the integrated circuits, controllers, or boards may include, for example, an application-specific integrated circuit, a field-programmable gate array, a combination of logic gates, a system-on-chip, a microprocessor, or another type of processing or control circuit.

When implemented in at least partially in software, the integrated circuits, controllers, or boards may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with another embodiment, an apparatus includes an interface; and a controller to output a signal through the interface, wherein the signal to have a level that corresponds to a shape of a microlens over a screen of a flexible display panel, the level to change the shape of the microlens to correspond to a refraction direction of light from the screen from a first direction to a second direction. The first direction is generated by a crease in the flexible display panel and the second direction corresponds a direction of a second microlens over the screen of the flexible display panel that does not correspond to the crease. The interface may take various forms, e.g., one or more output terminals, leads, wires, ports, signal lines (e.g., one or more of the signal lines in the aforementioned embodiments), or other type of interface without or coupled to the driver.

By way of summation and review, a flexible display device having a display unit on a flexible substrate has been developed. When a folding operation is repeatedly performed, the flexible display device is transformed in the folding area to include one or more creases. The creases cause light distribution deviation. As a result, luminance deviation occurs. Therefore, a viewing angle problem may occur when information is viewed on a screen of the device.

In accordance with one or more embodiments, a flexible display device includes a flexible display panel for displaying an image, a luminance deviation correction panel including a shape memory polymer layer with microlenses, and a driver for controlling the microlenses on the display panel. The driver generates signals for changing a shape of the microlenses to reduce or prevent luminance deviation and reduce or prevent the likelihood of a viewing angle problem.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A flexible display device, comprising:
a flexible display panel to display an image;
a correction panel including a shape memory polymer layer and a driver on the flexible display panel, the shape memory polymer layer including microlenses and the driver to control the microlenses; and
a flexible printed circuit board to connect the driver to a driving circuit board, wherein the driver includes a switching thin film transistor to control at least one microlens, the at least one microlens connected to an electrode storage plate, the electrode storage plate connected to a drain electrode of the switching thin film transistor and a common electrode, and wherein a shape of the at least one microlens is to change based on a first voltage, the first voltage based on a difference between a voltage transmitted to the electrode storage plate from the switching thin film transistor and a voltage from the common electrode.

2. The device as claimed in claim 1, wherein:
the driver includes a storage capacitor,
the switching thin film transistor is to transmit a data voltage from a data line to the at least one microlens through the electrode storage plate according to a switching voltage from a gate line, and
the storage capacitor is connected to the electrode storage plate through a first storage plate and is connected to the common electrode through a second storage plate, the storage capacitor to store the first voltage and to supply the first voltage to the at least one microlens.

3. The device as claimed in claim 2, wherein the correction panel includes:
a first substrate including the driver, the electrode storage plate, and the storage capacitor, and
a second substrate covering a shape memory polymer layer on the driver, the electrode storage plate, and the storage capacitor.

4. The device as claimed in claim 3, wherein the at least one microlens corresponds to a molded portion of the shape memory polymer layer.

5. The device as claimed in claim 3, wherein the second substrate includes black matrices respectively corresponding to the switching thin film transistor and the storage capacitor.

6. The device as claimed in claim 2, wherein the data line and the gate line extend in different directions relative to the at least one microlens.

7. The device as claimed in claim 6, wherein the flexible printed circuit board includes:
a first printed circuit board including a first driving integrated circuit connected to the data line to apply the data voltage, and
a second printed circuit board including a second driving integrated circuit connected to the gate line to apply the switching voltage.

8. The device as claimed in claim 1, wherein the correction panel includes the microlenses in a folding area of the display panel.

9. The device as claimed in claim 8, wherein the microlenses correspond to an entire area of the display panel.

10. The device as claimed in claim 1, further comprising:
a touch screen panel attached to an upper surface of the display panel; and
a window substrate covering the touch screen panel, wherein the correction panel is attached to the window substrate.

11. The device as claimed in claim 1, further comprising:
a touch screen panel attached to an upper surface of the display panel,
wherein the correction panel covers the touch screen panel to serve as a window substrate.

12. The device as claimed in claim 1, further comprising:
a touch screen panel attached to an upper surface of the display panel; and
a window substrate attached to an upper surface of the touch screen panel,
wherein the correction panel is between the touch screen panel and the window substrate.

* * * * *